US009772203B2

(12) United States Patent
Otobe

(10) Patent No.: US 9,772,203 B2
(45) Date of Patent: Sep. 26, 2017

(54) STATOR STRUCTURE OF VR TYPE RESOLVER AND VR TYPE RESOLVER

(71) Applicant: MINEBEA CO., LTD., Kitasaku-gun, Nagano (JP)

(72) Inventor: Haruki Otobe, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 391 days.

(21) Appl. No.: 14/322,081

(22) Filed: Jul. 2, 2014

(65) Prior Publication Data
US 2015/0028862 A1 Jan. 29, 2015

(30) Foreign Application Priority Data
Jul. 29, 2013 (JP) ................. 2013-156493

(51) Int. Cl.
G01B 7/14 (2006.01)
G01B 7/30 (2006.01)
H01F 5/00 (2006.01)
G01D 5/20 (2006.01)
F15B 15/28 (2006.01)

(52) U.S. Cl.
CPC ....... G01D 5/2046 (2013.01); F15B 15/2815 (2013.01); G05B 2219/37019 (2013.01); G05B 2219/37031 (2013.01); G05B 2219/37123 (2013.01)

(58) Field of Classification Search
CPC ........... G05B 2219/37019; G05B 2219/37031; G05B 2219/37123; G05B 2219/37133; F15B 15/2815

USPC ..... 324/51, 55, 200, 207.11, 207.13, 207.15, 324/207.16, 207.18
See application file for complete search history.

(56) References Cited

U.S. PATENT DOCUMENTS

| | | | |
|---|---|---|---|
| 2005/0280320 A1 | 12/2005 | Utsumi et al. | |
| 2009/0140595 A1* | 6/2009 | Naganawa | H02K 3/522 310/201 |
| 2010/0109491 A1* | 5/2010 | Miyazaki | G01B 7/30 310/68 B |

(Continued)

FOREIGN PATENT DOCUMENTS

| | | |
|---|---|---|
| JP | S55-044528 U | 3/1980 |
| JP | A-2005-300410 | 10/2005 |

(Continued)

OTHER PUBLICATIONS

Aug. 9, 2016 Office Action issued in Japanese Patent Application No. 2013-156493.

(Continued)

Primary Examiner — Giovanni Astacio-Oquendo
Assistant Examiner — Raul Rios Russo
(74) Attorney, Agent, or Firm — Oliff PLC

(57) ABSTRACT

A stator structure and a VR type resolver, in which the winding of the resolver can be prevented from corroding without increasing the production cost, are provided. The stator structure has stator protruding portions and coils wound around the stator protruding portions, the coils consisting of exciting coils, sine phase detection coils, and cosine phase detection coils, and at least the coils wound at the outermost side are formed by wires in which conductive portions are made of aluminum.

6 Claims, 3 Drawing Sheets

(56) References Cited

U.S. PATENT DOCUMENTS

| | | | |
|---|---|---|---|
| 2010/0117632 A1* | 5/2010 | Miyazaki | H02K 24/00 324/207.25 |
| 2010/0244816 A1* | 9/2010 | Nakamura | G01B 7/30 324/207.25 |
| 2011/0043196 A1* | 2/2011 | Fujita | G01D 5/2046 324/207.16 |
| 2011/0074400 A1 | 3/2011 | Nakano et al. | |
| 2011/0109304 A1* | 5/2011 | Suzuki | H02K 24/00 324/207.25 |
| 2012/0126646 A1 | 5/2012 | Nakagawa et al. | |
| 2012/0274316 A1* | 11/2012 | Matsuura | G01D 5/2046 324/207.17 |
| 2013/0049742 A1* | 2/2013 | Ochiai | H02K 24/00 324/207.16 |
| 2013/0162243 A1* | 6/2013 | Ochiai | G01D 5/2046 324/207.16 |

FOREIGN PATENT DOCUMENTS

| | | |
|---|---|---|
| JP | A-2009-133648 | 6/2009 |
| JP | 2010-200491 A | 9/2010 |
| JP | 2012-090441 A | 5/2012 |
| JP | 2012-110188 A | 6/2012 |
| WO | 2009/145085 A1 | 12/2009 |

OTHER PUBLICATIONS

Feb. 22, 2017 Office Action issued in Japanese Application No. 2013-156493.

\* cited by examiner

STATOR STRUCTURE OF VR TYPE RESOLVER AND VR TYPE RESOLVER

BACKGROUND OF THE INVENTION

Field of the Invention

The present invention relates to a stator structure of a VR type resolver and to a VR type resolver having a specific winding.

Description of Related Art

For example, a resolver can be used for detecting a rotation angle of an electric motor in electric vehicles or hybrid vehicles. In this case, in a wire used for a winding of the resolver, copper or copper alloy is used as a material and polyurethane, polyester, or the like, is used as a coating. A sulfide contained in an ATF (Automatic Transmission Fluid) oil which is used for the transmission permeates the polyurethane, polyester, etc., and corrodes the copper and alloy. As a result, there is a problem in that conduction of the winding is deteriorated.

As a technology which can solves this problem, Japanese Unexamined Patent Application Laid-open No. 2009-133648 discloses an angle detector in which a coil is insulated from a surrounding atmosphere thereof by an insulating oil. In addition, Japanese Unexamined Patent Application Laid-open No. 2005-300410 discloses a resolver in which a winding is covered with waterproof resin.

In the method that uses the insulating oil, it is necessary to have a structure for enclosing the insulating oil, and therefore, production cost is increased. In addition, since the insulating oil is used in environments that are exposed to vibration, there is a problem in that the insulating oil may leak out, and the reliability thereof is decreased. In a structure in which a winding is also covered with waterproof resin, producing processes are increased and the production cost is increased. In view of such circumstances, it is an object of the present invention to provide a stator structure and a VR type resolver in which the winding of the resolver can be prevented from corroding without increasing the production cost.

SUMMARY OF THE INVENTION

A first aspect of the present invention has a stator structure of a VR type resolver having stator protruding portions formed on a stator core and coils wound around the stator protruding portions, wherein the coils include exciting coils, sine phase detection coils and cosine phase detection coils, and at least the coils wound at the outermost side are formed by wires in which conductive portions are made of aluminum or wires in which coat portions are made of polytetrafluoroethylene (PTFE). According to the first aspect of the present invention, the outermost wire, which is exposed to an oil element containing an atmosphere, is made of aluminum or is formed by the wires in which coat portions are made of polytetrafluoroethylene, and whereby corrosion resistance of the winding wound around the stator protruding portions can be increased.

A second aspect of the present invention has the stator structure of a VR type resolver according to the first aspect, in which all coils of the exciting coils, the sine phase detection coils, and the cosine phase detection coils are formed by wires in which conductive portions are made of aluminum or wires in which coat portions are made of polytetrafluoroethylene.

A third aspect of the present invention has the stator structure of a VR type resolver according to the first aspect, wherein the exciting coils are wound at the outermost side of the coils, and the sine phase detection coils and the cosine phase detection coils are formed by wires in which conductive portions are made of aluminum or wires in which coat portions are made of polytetrafluoroethylene. According to the third aspect of the present invention, the coils around the stator protruding portions can be prevented from corroding and the production cost will not be increased. Also, the sine phase detection coils and the cosine phase detection coils can have the same characteristics.

A fourth aspect of the present invention has the stator structure of a VR type resolver according to the first aspect, wherein the sine phase detection coils and the cosine phase detection coils are wound at the outermost side of the coils, and the sine phase detection coils and the cosine phase detection coils are formed by wires in which conductive portions are made of aluminum or wires in which coat portions are made of polytetrafluoroethylene.

A fifth aspect of the present invention has the stator structure of a VR type resolver according to the first aspect, wherein the exciting coils, the sine phase detection coils, and the cosine phase detection coils have a plurality of terminals for connecting to edges thereof, respectively, and the terminals are made of aluminum. According to the fifth aspect, the corrosion resistance of the terminals can be improved.

A sixth aspect of the present invention has a VR type resolver having the stator structure according to the first aspect, wherein a rotor is rotatably arranged at a position facing the stator protruding portions of the stator core.

According to the present invention, the winding of the resolver can be prevented from corroding without increasing the production cost.

PREFERRED EMBODIMENTS OF THE INVENTION

1. First Embodiment

Structure

Figure 1:
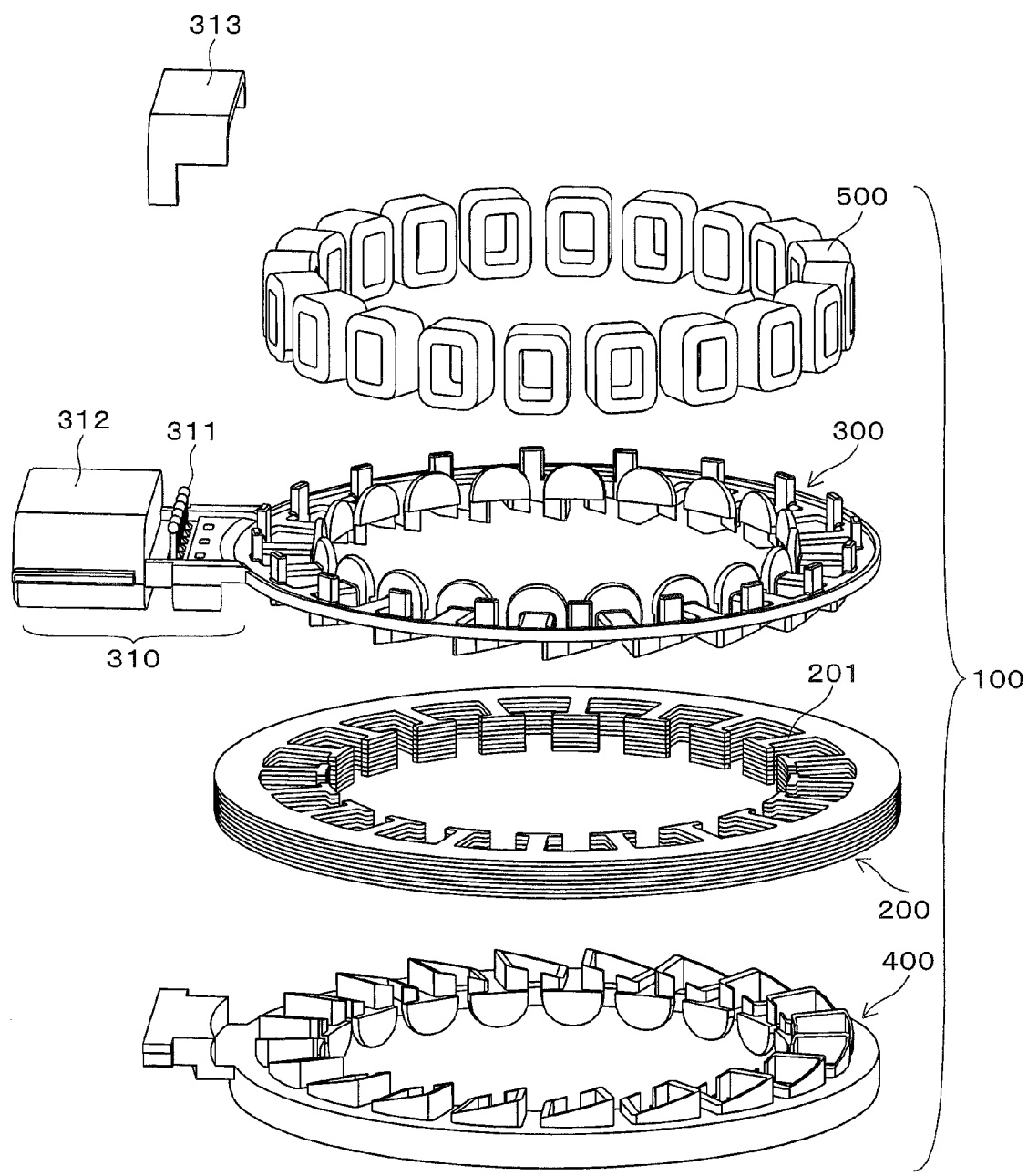
FIG. 1 is an exploded perspective view showing an embodiment of the present invention.
Figure 2:
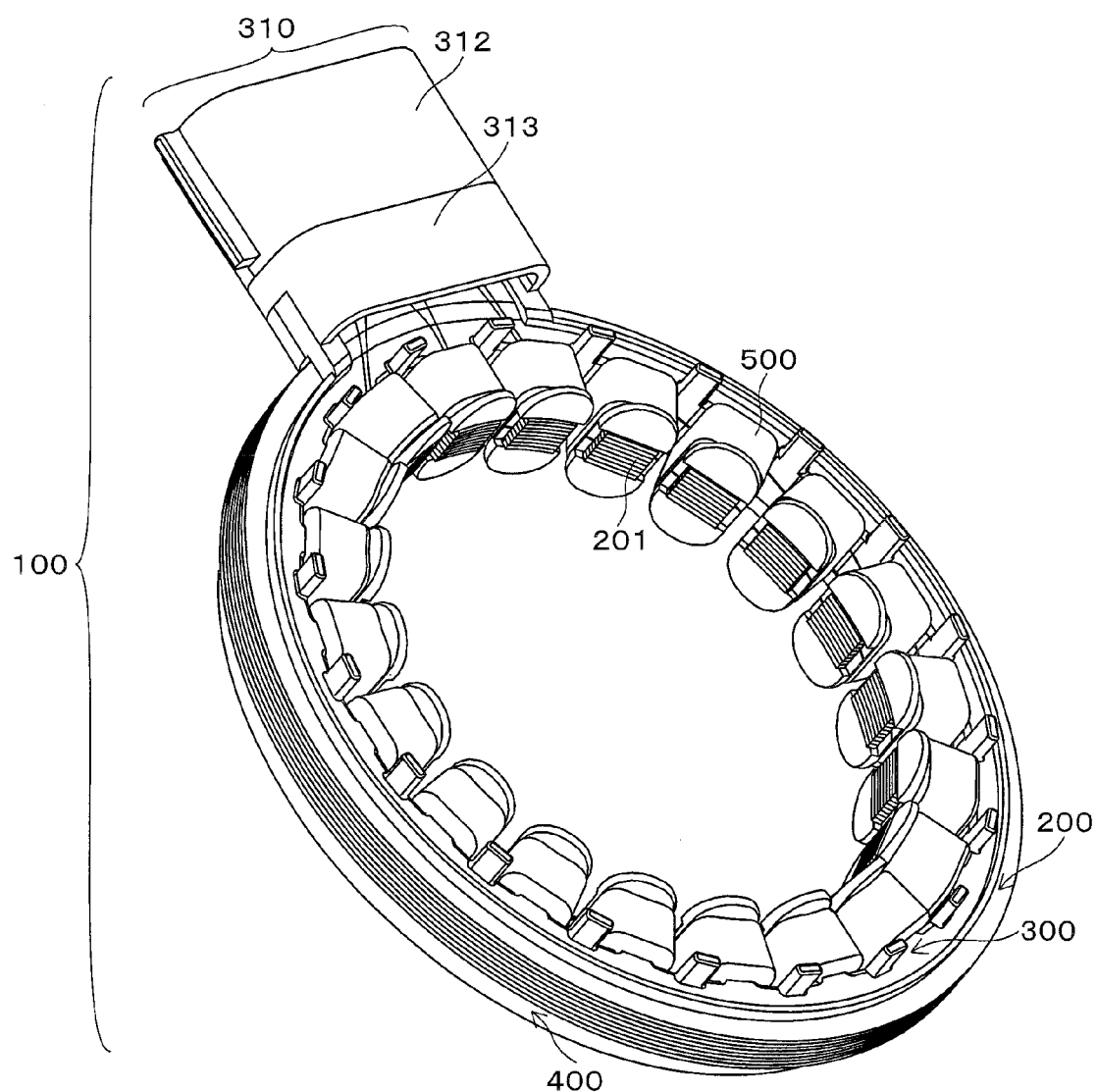
FIG. 2 is a perspective view showing an embodiment of the present invention.

FIGS. 1 and 2 show a VR type (variable reluctance type) resolver 100 of an embodiment of the present invention. The resolver 100 has stator cores 200, an upper insulator 300, a lower insulator 400, and coils 500. The stator cores 200 have a plurality of stator protruding portions 201 which have an approximately ring shape and extend in an axial center direction. The stator protruding portions 201 are arranged at even intervals along a circumferential direction. The stator cores 200 are formed by magnetic material such as an electromagnetic steel sheet, and have a structure in which a plurality of tabular members having a shown shape is laminated in an axial direction.

The upper insulator 300 and the lower insulator 400 are made of resin and are mounted to the stator cores 200 from front and behind (top and bottom of FIG. 1) in an axial direction of the stator cores 200. After mounting the insulators, coils 500 are wound around the stator protruding portions 201 of the stator cores 200. The stator cores 200 and the coils 500 are insulated by the upper insulator 300 and the lower insulator 400.

Figure 3:
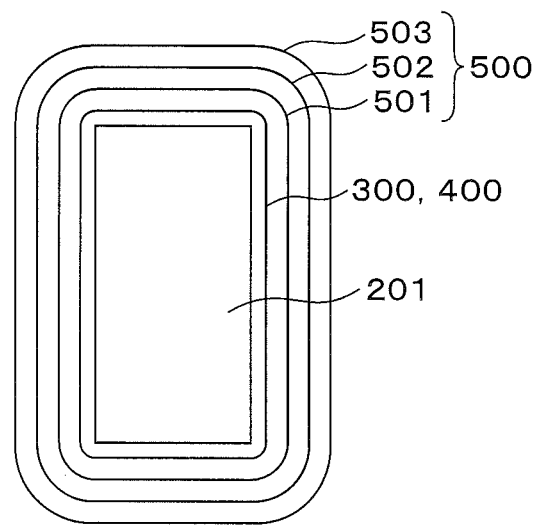
FIG. 3 is a sectional view showing stator protruding portions.

FIG. 3 shows a cross section viewed from an extending direction of the stator protruding portions around which the coils 500 are wound. A structure of the cross section shown in FIG. 3 is the same as those of the stator protruding portions 201. On the stator protruding portions 201, sine phase detection coils 501, cosine phase detection coils 502, and exciting coils 503 are wound through the insulators 300 and 400, so that the coils are outwardly laminated in this order. That is, the stator protruding portions 201 are protected by the insulators 300 and 400, the sine phase detection coils 501, the cosine phase detection coils 502 and the exciting coils 503 are wound in this order on the outside thereof, and therefore, a structure in which the exciting coils 503 are located outermost, is formed.

Here, the sine phase detection coils 501, the cosine phase detection coils 502 and the exciting coils 503 are formed by wires in which conductive portions are made of aluminum as a magnet wire or wires in which coat portions are made of polytetrafluoroethylene. As a wire in which conductive portions are made of aluminum, a magnet wire in which the conductive portions are made of aluminum, or a magnet wire in which the conductive portions are made of aluminum alloy and the coat portions are made of polyurethane, polyester, etc., to insulate, can be used. In addition, as a wire in which coat portions are made of polytetrafluoroethylene, a magnet wire in which the conductive portions are made of not only aluminum, but also copper or an alloy containing mainly copper and are covered with polytetrafluoroethylene, can be used.

With respect to each coil of the sine phase detection coils 501, the cosine phase detection coils 502 and the exciting coils 503, one magnet wire is wound around each stator protrusion 201, respectively, and both edges thereof are connected to terminals 311 described below.

The upper insulator 300 has an integrated molded terminal portion 310, as shown in FIG. 1. The terminals 311 made of aluminum are fixed to the terminal portion 310, and each coil of the sine phase detection coils 501, the cosine phase detection coils 502, and the exciting coils 503 is connected to one edge of the terminals 311. Furthermore, the terminal portion 310 has a connector portion 312. For example, the connector portion 312 has a hollow structure as shown in FIG. 1. The other edge of the terminals 311 protrudes from an inside bottom of the hollow structure and is connected to a connector (not shown) which connects to an external device. A terminal cover 313 is attached to the terminals 311 in order to protect the terminals 311. In addition, varnish, etc., is applied to windings which constitute the coils 500 and lines which are drawn from the windings.

The stator protruding portions 201 formed on the inside in a radial direction of the stator cores 200 are facing an outer circumference of a rotor core, which is not shown, the rotor core is rotatably held, and thereby, a VR type resolver is formed. Explanations about a structure of the rotor core and a holding structure of the rotor core are omitted since the structures are the same as those in common VR type resolvers.

Advantages

By forming the coils 500 using wires in which conductive portions are made of aluminum as a magnet wire or wires in which coat portions are made of polytetrafluoroethylene, a VR type resolver having a winding structure which is resistant to corrosion due to an oil used in an engine compartment can be obtained without requiring special devices or elements. In addition, by making them of aluminum, the terminals 311 can be easily and surely connected to the coils 500, and the corrosion resistance of the terminals 311 can be ensured. Furthermore, the winding can be reduced in weight by using aluminum as a material of the conductive portion of the magnet wire.

2. Second Embodiment

Figure 4:
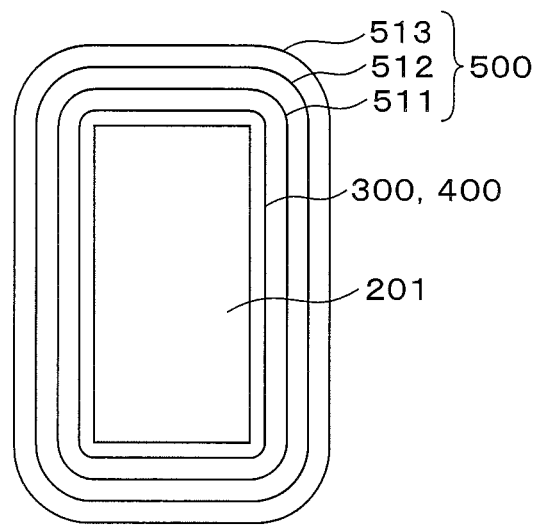
FIG. 4 is a sectional view showing stator protruding portions.

In the following, another embodiment of the winding of the coils 500 will be explained. FIG. 4 shows a cross section of a stator protruding portion 201 in which a coil 500 is wound therearound. In this embodiment, a sine phase detection coil 511, a cosine phase detection coil 512, and an exciting coil 513 are outwardly wound in this order (from a side close to the stator protruding portion 201) around the stator protruding portion 201 through insulators 300 and 400.

Here, the sine phase detection coil 511 and the cosine phase detection coil 512 are formed by a common type of wire, and for example, in the wire, a conductive portion is made of copper or copper alloy, and a coat portion is made of polyurethane, polyester, etc. The exciting coil 513 is formed by a wire in which a conductive portion is made of aluminum or aluminum alloy. In this structure, the exciting coil 513 made of aluminum is used as the outermost coil, which is in contact with a surrounding atmosphere, and as a result, the corrosion resistance of the exciting coil 513 is ensured. In addition, the sine phase detection coil 511 and the cosine phase detection coil 512 are arranged at the inside of the exciting coil 513 and are not exposed to the surrounding atmosphere, and therefore, there are no problems even if the conductive portion is made of copper or copper alloy.

According to the structure of the present embodiment, by using copper wires as the sine phase detection coil 511 and the cosine phase detection coil 512 while ensuring the corrosion resistance of the coil, the production cost can be prevented from increasing. Furthermore, it is important that the sine phase detection coil 511 and the cosine phase detection coil 512 have the same characteristics such as impedance, etc., in order to detect sine phases and cosine phases. This requirement can be satisfied by using coils made of the same material.

Other Matters

An exciting coil formed by a copper wire may be wound around the innermost of a stator protruding portion 201, and a sine phase detection coil and a cosine phase detection coil formed by an aluminum wire may be wound at the outside thereof. In this structure, the outmost coil (the sine phase detection coil or the cosine phase detection coil) may be made of aluminum, and inner two layers may be formed by windings made of copper. In addition, terminals 311 may be formed by materials other than aluminum in which the surface thereof is covered with material having corrosion resistance.

The embodiments of the present invention are not limited to each of the above embodiments and various modifications that may be anticipated by one skilled in the art are included. In addition, the effects of the present invention are also not limited to the description above. That is, various additions, changes, and partial deletions can be made in a range that does not exceed the general concept and object of the present invention as claimed in the Claims and equivalents thereof.

What is claimed is:

1. A stator structure of a variable reluctance (VR) type resolver used in an engine compartment, comprising
    stator protruding portions formed on a stator core; and
    coils wound around the stator protruding portions,
        wherein the coils consist of exciting coils, sine phase detection coils and cosine phase detection coils,
        wherein coils wound at an innermost side are formed by wires in which conductive portions are made of copper and/or copper alloys,
        wherein the coils wound at an outside of the coils wound at the innermost side are formed by wires in which conductive portions are made of aluminum and/or aluminum alloys, and
        wherein the coils wound at the innermost side have coat portions coating the conductive portions, the coat portions being made of polytetrafluoroethylene.

2. The stator structure of a VR type resolver according to claim 1, wherein all coils of the exciting coils, the sine phase detection coils, and the cosine phase detection coils are formed by wires in which coat portions are made of polytetrafluoroethylene.

3. The stator structure of a VR type resolver according to claim 1, wherein the exciting coils are wound at the outermost side of the coils, and the sine phase detection coils and the cosine phase detection coils which are wound at an inside of the exciting coils are formed by wires in which conductive portions are made of copper and/or copper alloys.

4. The stator structure of a VR type resolver according to claim 1, wherein the sine phase detection coils and the cosine phase detection coils are wound at the outermost side of the coils, and the sine phase detection coils and the cosine phase detection coils are formed by wires in which conductive portions are made of aluminum and/or aluminum alloys.

5. The stator structure of a VR type resolver according to claim 1, wherein the exciting coils, the sine phase detection coils and the cosine phase detection coils have a plurality of terminals for connecting to edges thereof, respectively, and the terminals are made of aluminum and/or aluminum alloys.

6. A VR type resolver having the stator structure of a VR type resolver according to claim 1, wherein a rotor is rotatably arranged at a position facing the stator protruding portions of the stator core.

* * * * *